United States Patent [19]

Bailey et al.

[11] 4,152,758

[45] May 1, 1979

[54] CONTROL LOGIC FOR A PHASE CONTROLLED RECTIFIER SYSTEM

[75] Inventors: Ronald B. Bailey; Thomas D. Stitt; Dennis F. Williamson, all of Erie, Pa.

[73] Assignee: General Electric Company, Erie, Pa.

[21] Appl. No.: 836,457

[22] Filed: Sep. 26, 1977

[51] Int. Cl.² .......................................... H02M 7/155
[52] U.S. Cl. ...................................... 363/85; 318/778; 318/345 G
[58] Field of Search ........... 318/251, 227, 342, 345 R, 318/345 C, 345 G; 363/37, 84, 85

[56] References Cited

U.S. PATENT DOCUMENTS

| | | | |
|---|---|---|---|
| 3,273,043 | 9/1966 | Clarke et al. | 363/85 X |
| 3,564,365 | 2/1971 | Zelina | 318/251 |
| 3,593,088 | 7/1971 | Pantelakis et al. | 318/345 G |
| 4,044,284 | 8/1977 | Plunkett et al. | 318/227 |

Primary Examiner—William M. Shoop
Attorney, Agent, or Firm—J. H. Beusse

[57] ABSTRACT

Apparatus for providing firing signals to a phase controlled rectifier circuit at a time at which valves in the rectifier circuit are forward biased without the need for providing continuous firing signals. The apparatus monitors the voltage applied across the rectifier valves and provides a signal when a valve is forward biased. This signal is applid to a gating circuit which determines whether a normal phase control firing command was initiated prior to the time the valve became forward biased. If such a command was initiated, the gating circuit passes the signal to a valve firing circuit which provides firing signals to the rectifier circuit. If the firing command was not previously initiated, the signal is inhibited and firing signals are subsequently applied to the rectifier circuit upon receipt of a firing command.

6 Claims, 5 Drawing Figures

CONTROL LOGIC FOR A PHASE CONTROLLED RECTIFIER SYSTEM

BACKGROUND OF THE INVENTION

The present invention relates to a control system for a phase controlled rectifier circuit and more particularly to a control system for assuring that electric valves in a phase control rectifier circuit are provided with firing signals at a time when the valves are forward biased.

There are many known power conversion circuits for changing the form of electric power from alternating current to direct current. Such circuits are properly referred to as rectifiers. In some of these circuits the conversion is accomplished by appropriately controlling periodically conducting electric valves that are interconnected between a-c and d-c terminals, the a-c terminals being connected to a system of alternating voltage with which the valve firings are synchronized. A capacitor connected across the d-c terminals serves to filter and smooth the d-c output of the rectifier circuit. In modern practice each valve typically comprises one or more solid state gate controlled switching components known as semiconductor controlled rectifiers or thyristors.

In operation, such a valve has a non-conducting or blocking state, in which it presents very high impedance to the flow of current, and a conducting or turned-on state in which it freely conducts forward current with only a relatively slight voltage drop. It can be switched abruptly from the former state to the latter by the concurrence of a forward bias on its main electrodes (anode at a positive potential with respect to cathode) and a control or trigger signal on its gate. The time at which the valve is turned on, measured in electrical degrees from a cyclically recurring instant at which its anode voltage first becomes positive with respect to its cathode, is known as the "firing angle." The magnitude of the output voltage of the rectifier circuit can be varied by retarding or advancing the firing angle as desired.

Once turned on, a valve will continue conducting until "forward current" is subsequently reduced below a given holding level by the action of the external circuit in which the valve is connected. In a single rectifier circuit, the valve may be turned off by the action of the a-c input voltage becoming less than the d-c output voltage so that the valve is reversed biased and the current through the valve drops to below the necessary holding value. If, however, the filter includes a series inductor connected between the valve and the capacitor, the valve will not turn off until the inductor current goes to zero. Alternately, turn off may occur when the a-c line voltage reverses and transfers current from the valve to a free-wheeling path. The free-wheeling path may comprise a unidirectional conducting device connected across the rectifier's d-c terminals or may comprise a portion of the rectifier circuit itself.

In some applications the load connected to the d-c terminals of the rectifier circuit is variable. If the load is relatively light, whereby the rectifier current is discontinuous, the voltage on the d-c filtering capacitor will tend to approach the peak value of the a-c input voltage. Consequently, a trigger signal applied to the valve may occur at a time at which the valve is reversed biased (cathode at a positive potential with respect to anode) and the valve will not be triggered into conduction. Under light load conditions, the required rectifier current is small and the firing angle to maintain the desired d-c voltage tends to be retarded, i.e., the conduction phase angle of the valves is small and the current through the series inductor to the filter capacitor is discontinuous. Without current flow through the inductor, its voltage drop is essentially zero and the voltage on the capacitor is reflected to the phase controlled rectifier circuit. When the load is increased thereby causing the d-c voltage to begin dropping, the system will attempt to correct the voltage reduction by advancing the firing angle. However, an advanced firing angle can result in a firing pulse occurring at a time at which the valves in the phase controlled rectifier circuit are reverse biased. Accordingly, the d-c voltage cannot be built-up from a light load condition.

One prior art method of overcoming the problem associated with failure of a valve to trigger is to provide a continuous trigger signal from the desired firing time until the next zero crossing of the a-c input voltage. The continuous trigger signal may be either a d-c voltage or a relatively high frequency series of pulses. Both types of trigger signals are in common use. However, continuous triggering of the valve presents several problems in addition to increased cost. For example, the triggering circuit must be isolated from the power circuit using pulse transformers. For continuous triggering, the pulse transformer must be capable of dissipating approximately 100 times more watt-seconds of energy than is required for a single pulse. The power supply required for supplying the continuous trigger signal is also large. Furthermore, solid state valves tend to have increased reverse leakage current when triggered during reverse bias conditions and in addition to overheating are susceptible to thermal runaway.

Accordingly, it is an object of the present invention to provide a control system including a phase controlled rectifier circuit with assured firing without continuous triggering.

SUMMARY OF THE INVENTION

In one embodiment of our invention, the valve triggering system comprises means connected to compare the d-c voltage at the d-c terminals of the rectifier circuit to a reference voltage. The comparison means provides a voltage signal whose amplitude is representative of the sum of the magnitude of the reference signal and the difference in magnitude between the reference signal and the d-c terminal voltage. The voltage signal is compared with a ramp function signal which is synchronized to the a-c input voltage. This latter comparison produces a valve firing signal when the magnitude of the ramp function signal crosses the magnitude of the voltage signal. In order to assure that the valve is triggered, our invention includes means for comparing the d-c terminal voltage to the a-c terminal voltage and for generating a re-firing signal when the a-c voltage magnitude becomes greater than the d-c voltage magnitude. The system further includes means for inhibiting application of the re-firing signal to the valve unless the re-firing signal was preceded by a firing signal during that half cycle of the a-c voltage. This system offers the advantage of providing a trigger signal of relatively short duration while assuring that a valve will be triggered during a time when it is forward biased.

DESCRIPTION OF THE DRAWINGS

The invention will be better understood and its various objects and advantages will be more fully appreciated from the following description taken in conjunction with the accompanying drawings in which.

DETAILED DESCRIPTION

Figure 1:
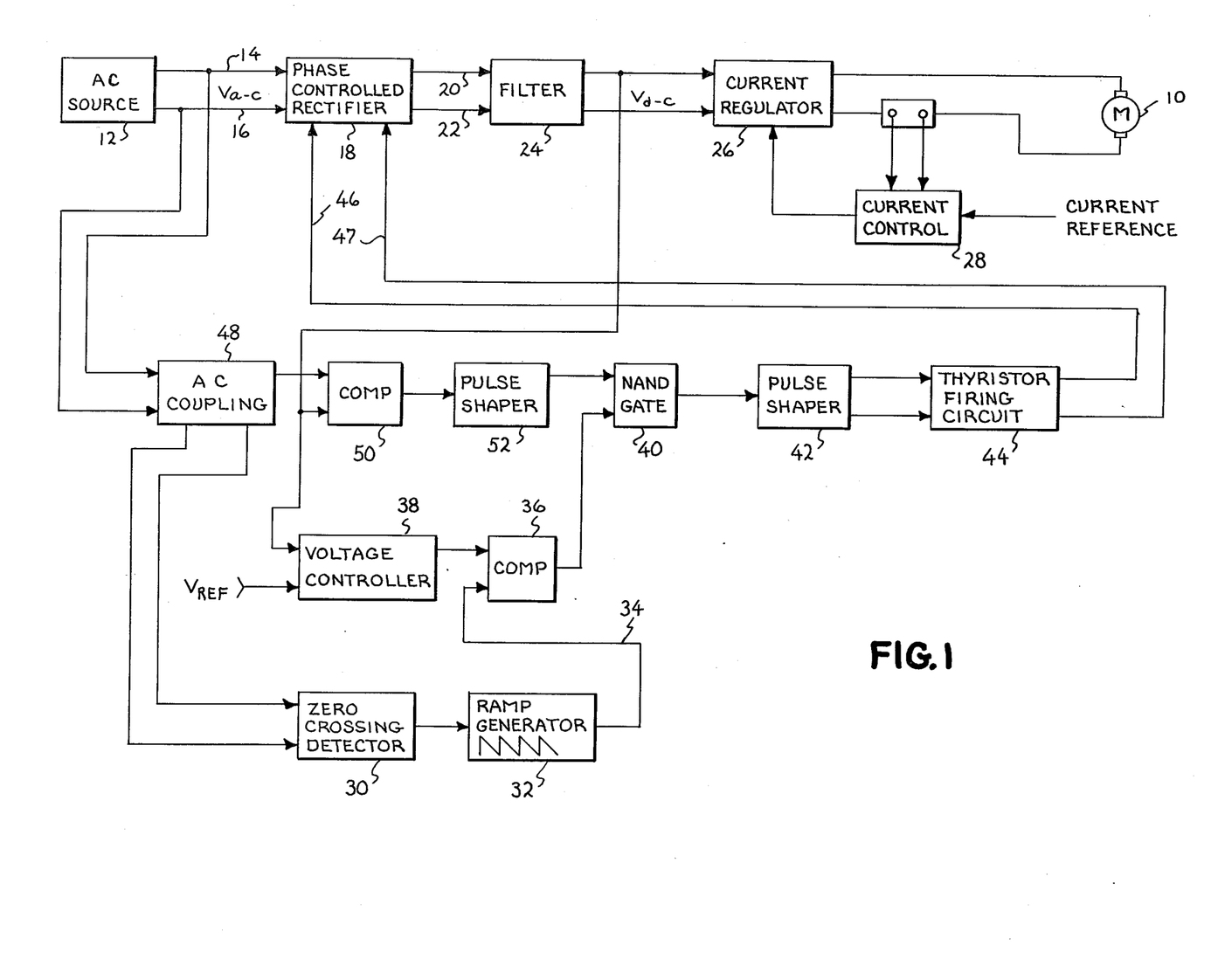
FIG. 1 is a block diagram of a control system for an electric motor which includes a phase control rectifier circuit with which our valve re-firing system can be advantageously used in practice.

Referring now to FIG. 1 there is shown a block diagram of a control system for an electric motor 10 incorporating the present invention. The motor 10 may be a part of a power system for a traction vehicle such as a locomotive or transit car. Power for the motor may be supplied from an a-c source 12 which may comprise, for example, a catenary or third rail system supplying relatively high voltage alternating current to the traction vehicle. The magnitude of the a-c line voltage may be, for example, 25,000 volts rms. The a-c voltage is coupled by lines 14 and 16 from the source 12 to a-c input terminals of a phase controlled rectifier circuit 18. Source 12 typically includes a transformer (not shown) which steps the 25 kv down to a nominal 1800 volts rms. Rectifier circuit 18 is preferably a full wave bridge rectifier circuit of a type well known in the art including gateable valve such as thyristors or silicon controlled rectifiers (SCR) located in selected legs of the bridge circuit. Rectifier circuit 18 converts the a-c voltage to full wave rectified d-c voltage at its d-c output terminals. The d-c voltage is coupled via lines 20 and 22 to a filter circuit 24. The filter circuit 24 is of a type well known in the art and may comprise either a single capacitor connected across the lines 20 and 22 or, as is more typical, a series inductor/shunt capacitor circuit which serves to minimize the ripple content of the d-c voltage and current from rectifier circuit 18.

Connected across the output terminals of the filter circuit 24 is a power regulator circuit 26. The regulator circuit 26 may comprise a time ratio control or chopper circuit of a type well known in the art which regulates motor current by periodically connecting and disconnecting the motor to the d-c output voltage from filter circuit 24, in which event the motor 10 would comprise a d-c motor. The circuit 26 controls the current and thus the power output of motor 10 by varying its duty factor, i.e., the ratio of its conducting time to its non-conducting time. Control of the circuit 26 is affected by a current control circuit 28 which, in the illustrated embodiment, compares the actual current flowing in motor 10 to a current reference signal and supplies gating signals to regulator circuit 26 to vary its duty factor in order to minimize the difference between the actual current and the current reference signal. The current reference signal may be supplied from an operator control (not shown). A description of a current control circuit for controlling the operation of a chopper power regulator circuit supplying power to a motor is shown in U.S. Pat. No. 3,866,098—Weiser, issued Feb. 11, 1975 and assigned to the General Electric Company.

In an alternate embodiment the regulator circuit 26 may comprise an inverter such as, for example, an impulse commutated inverter operated in a pulse width modulation mode. Where regulator circuit 26 comprises an inverter, motor 10 would comprise an a-c motor. Inverters suitable for the present application are described in the text *Principles of Inverter Circuits* by B. D. Bedford and R. G. Hoft, published in 1964 by John Wiley & Sons, Inc., New York, N.Y. A typical inverter is also shown in U.S. Pat. No. 3,207,974—McMurray, issued Sept. 21, 1965 and assigned to General Electric Co. The implementation of current control 28 for providing firing signals to an inverter is similarly disclosed in the Bedford and Hoft text supra.

In a typical d-c traction vehicle application wherein the motor 10 is a traction motor, it is nominally rated at 1000 volts d-c. However, the value of the voltage from a-c source 12 may be as much as 3000 volts peak. In order to limit the level of voltage applied to the motor 10 and chopper circuit 26, the phase controlled rectifier circuit 18 is phase controlled when discontinuous current exists so that the d-c voltage is within the voltage limit of the regulator circuit 26 and the motor 10. The d-c output of the phase controlled rectifier circuit 18 is controlled by varying the firing angle of the valves within the rectifier circuit. The firing angle is controlled by supplying triggering signals to the valves at predetermined times within each half cycle of the a-c voltage applied to the a-c input terminals of the circuit 18. The triggering signals are supplied from a system which compares the d-c output voltage of the filter circuit 24 to a reference voltage and supplies signals at appropriate times in each half cycle of operation to gate the valves into conduction so as to minimize the difference between the d-c output voltage and the voltage reference signal. This system includes a zero crossing detector 30 of a type well known in the art which detects each zero crossing of the a-c voltage waveform. The zero crossing detector thereafter provides a pulse signal at each zero crossing to a ramp generator circuit 32 of a type well known in the art. The ramp generator circuit 32 is reset to its initial value by each of the pulses from the zero crossing detector 30. After each reset condition the ramp generator circuit 32 provides a linearly varying ramp output signal which is applied via line 34 to a comparison circuit 36. The d-c voltage developed at the output of filter circuit 24 is also coupled to an input terminal of a voltage control circuit 38 which includes an integral plus proportional amplifier circuit. A reference signal representative of the desired magnitude of d-c voltage is applied to a second input terminal of the voltage control circuit 38 for generating an error signal representative of the amplified difference between the reference signal and the d-c voltage. The control circuit 38 provides an output signal representative of the required firing angle of the valves in the control rectifier circuit 18 to minimize the difference between the actual d-c voltage and the voltage reference signal. The output signal developed by control circuit 38 is coupled to a second input terminal of the comparison circuit 36. In the illustrated embodiment the ramp function signal from ramp generator circuit 32 is a negative going signal. When the amplitude of the ramp function signal becomes less than the magnitude of the voltage signal from control circuit 38, the comparison circuit 36 will change its output state. This change in output state is detected by a logical NAND gate 40 which is also connected to change its output state and thus provide a signal to a pulse shaper 42. The pulse shaper 42 may be, for example, a one shot multivibrator. The triggering signals developed by the pulse shaper 42 are applied to a thyristor firing circuit 44 which provides sufficient power to trigger the valves in the rectifier circuit 18. The signals developed by the thyristor firing circuit 44 are coupled via lines 46 and 47 to valves in the rectifier circuit 18.

If the firing signals from firing circuit 44 occur at a time at which the d-c voltage at the d-c output terminals of rectifier circuit 18 is greater than the a-c voltage at the a-c input terminals of the rectifier circuit, the firing signals will be ineffective to trigger the valves into conduction because the valves are reverse biased. Since this failure to trigger may result in undesirable system transients, a re-firing circuit is provided to assure that a re-firing signal will occur as soon as the a-c voltage rises above the d-c voltage, i.e., when the valves become forward biased. This re-firing circuit comprises a second comparison circuit 50 which compares the instantaneous magnitude of the a-c voltage to the magnitude of the d-c voltage. The a-c voltage is coupled to the comparison circuit 50 through a coupling circuit 48. When the a-c voltage is greater than the d-c voltage the comparison circuit 50 changes its output state and provides a signal to a second pulse shaper 52. The pulse shaper 52 may also comprise a monostable or one shot multivibrator which provides an output pulse signal of predetermined time duration in response to the signal from comparison circuit 50. The signal from pulse shaper 52 is coupled to a second input terminal of the NAND gate 40 where it is combined (as a logical AND) with the normal firing signal and thereafter coupled through pulse shaper 42 and thyristor firing circuit 44 to the valves in rectifier circuit 18. The re-firing signal assures that a trigger signal will be applied to the rectifier circuit 18 at a time at which the valves are forward biased.

Figure 2:
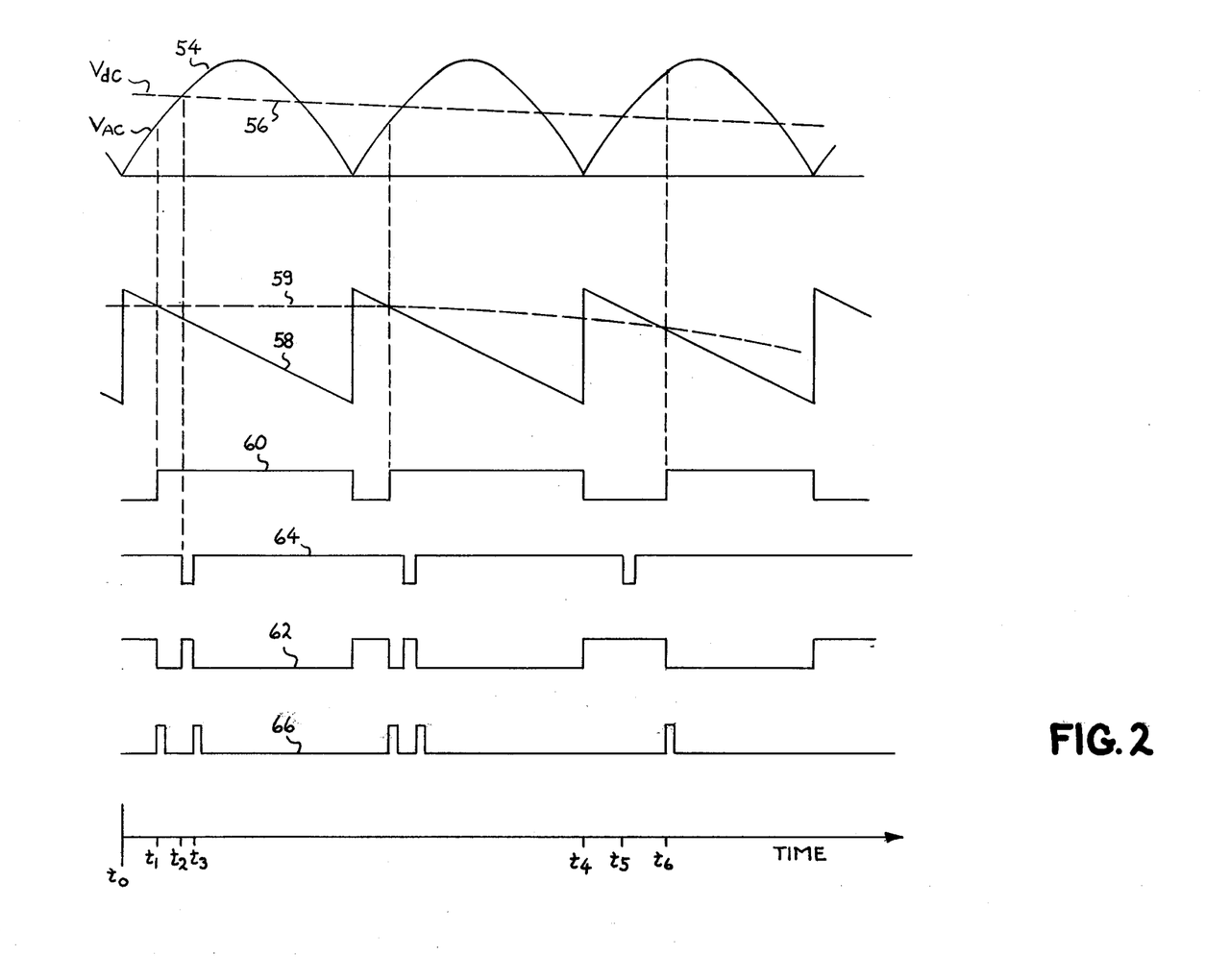
FIG. 2 illustrates the voltage and current waveforms occurring at selected points in the system of FIG. 1.

For a better understanding of the inventive arrangement of FIG. 1, reference may be had to the illustrative waveforms characteristic of the circuit of FIG. 1 which are shown in FIG. 2. The a-c voltage signal from a-c source 12 is reduced in amplitude and full wave rectified for application to the comparison circuit 50. The rectified a-c waveform is illustrated at 54 in FIG. 2. The line 56 represents the idealized value of the d-c signal at the output of filter circuit 24, it being noted that the actual d-c voltage would have a measurable ripple content. The graph at 58 represents the ramp function signal developed by ramp function generator 32. As can be seen the ramp function signal is synchronized with the zero crossings of the a-c waveform 54. The graph at 59 superimposed on the ramp function signal 58 represents the analog error signal from voltage control circuit 38.

The graph at 60 represents the output signals developed by the comparison circuit 36. The output of the comparison circuit 36 is normally at a logic zero level and switches to a logic 1 level when the voltage error signal from control circuit 38 becomes greater in magnitude than the instantaneous value of the ramp function signal 58. The signal 60 from the comparison circuit 36 is applied to an input terminal of NAND gate 40 which then generates the waveform illustrated at 62. The NAND gate 40 has one input terminal connected to receive the signal 60 and a second input terminal connected to receive the signal developed by pulse shaper 52. The input signals to the NAND gate 40 during a normal state, i.e., prior to initiation of any firing signals, are selected to be a logic zero from the comparison circuit 36 and a logic one from the pulse shaper 52. When the comparison circuit 50 changes state as a result of the magnitude of the a-c voltage becoming greater than the magnitude of the d-c voltage, a signal is generated by the pulse shaper 52 of the form indicated at 64. As noted previously the pulse shaper 52 may comprise a monostable multivibrator and as such produces an output pulse of a fixed time duration as shown in the graph at 64.

As will be appreciated by those skilled in the art, so long as the output signal from pulse shaper 52 remains at a logic one level, a change in state of the output signal from comparison circuit 36 will result in a change in the logical state of the output signal developed by NAND gate 40. However, a change in the state of the output signal of pulse shaper 52 from a logic one to a logic zero will have no effect on the state of the output signal developed by NAND gate 40 so long as the state of the signal from comparison circuit 36 remains at a logic zero level. The effect of this discrimination between the two input signals to NAND gate 40 can be seen in the graph at 66 which indicates the combined firing signals supplied to the thyristor firing circuit 44 from the pulse shaper 42. At the time indicated at $t_1$, the comparison circuit 36 changes state causing the output of NAND gate 40 to change state as indicated on the waveform 62. When the output of NAND gate 40 transitioned from a logic one to a logic zero level, this transition caused the pulse shaper 42 to be triggered resulting in a firing signal occurring at time $t_1$ as indicated by the graph 66. At time $t_2$ the amplitude of the a-c voltage (waveform 54) became greater than the amplitude of the d-c voltage (line 56) causing a logic zero signal to be developed by the pulse shaper 52 and resulting in a change in the output state of NAND gate 40 from a logical zero to a logical one. However, the pulse shaper 42 only responds to negative going trigger signals and thus did not generate a firing signal at time $t_2$. At time $t_3$ pulse shaper 52 timed out and its output signal reverted back to a logic one level resulting in the output signal from NAND gate 40 transitioning back to a logic zero level. The negative going trigger signal from NAND gate 40 triggered the pulse shaper 42 causing a re-firing signal to be generated at time $t_3$. Thus the circuit resulted in a re-firing signal being generated a predetermined time period after the a-c voltage became greater than the d-c voltage therefore assuring that a trigger signal is applied to the phase control rectifier circuit 18 at a time when its valves are forward biased. At the beginning of the second half cycle of the a-c waveform 54, a similar series of events occurs. However, during a third half cycle the d-c voltage has been reduced considerably and the firing signal developed by comparison circuit 36 does not occur until after the magnitude of the a-c voltage waveform 54 has increased above the magnitude of the d-c voltage indicated at 56. The pulse shaper 52 developed an output signal at time $t_5$ as indicated on line 64. However, at time $t_5$ the output signal from comparison circuit 36 was still at a logic zero level and the fact that the second input signal to NAND gate 40 transitioned to a logic zero level had no affect on the output signal developed by NAND gate 40. Consequently, the output signal developed by NAND gate 40 did not change state at the time that the a-c voltage waveform increased in magnitude above the d-c voltage. At time $t_6$ the comparator 36 changed state resulting in logic one signals being applied to both input terminals of NAND gate 40 causing the output signal from NAND gate 40 to transition to a logic zero state. The pulse shaper 42 was thus triggered and a firing pulse applied to the thyristor firing circuit 44. It can therefore be seen that the inventive circuit assures that a re-firing signal will be applied to the valves in the phase control rectifier circuit 18 providing that a firing signal had occurred in the half cycle of the a-c voltage waveform preceding the time that the a-c voltage magnitude increased above the d-c voltage magnitude. In the event that the a-c voltage rises above the d-c voltage prior to the initiation of a firing signal, the re-firing signal at transitioning time will be inhibited and will not pass to the thyristor firing circuit 44.

Figures 3, 3B:
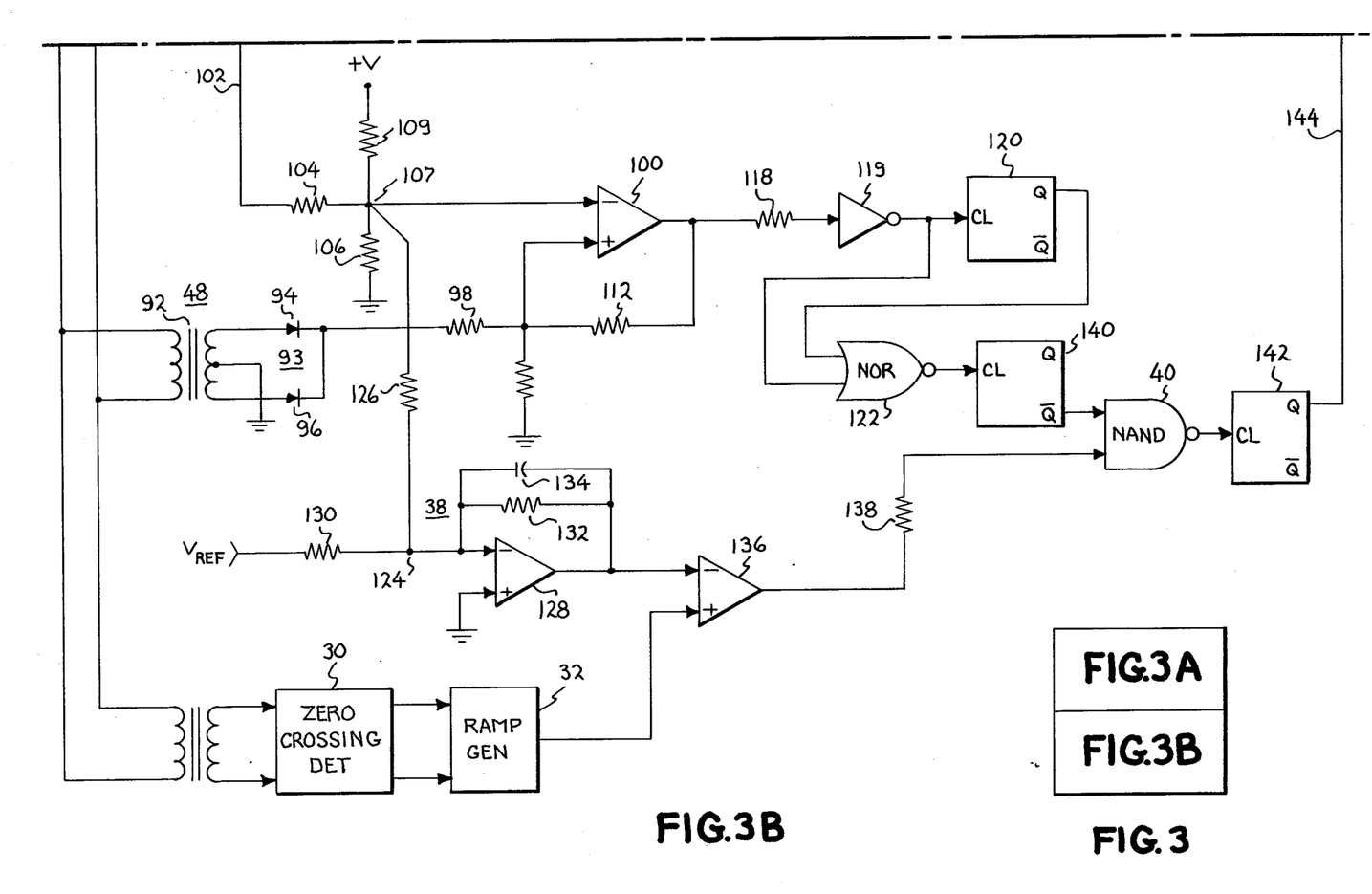
FIG. 3 is a block diagram illustrating the interrelationship of FIGS. 3A and 3B.
FIG. 3B is a simplified schematic of the present invention.
Figure 3A:
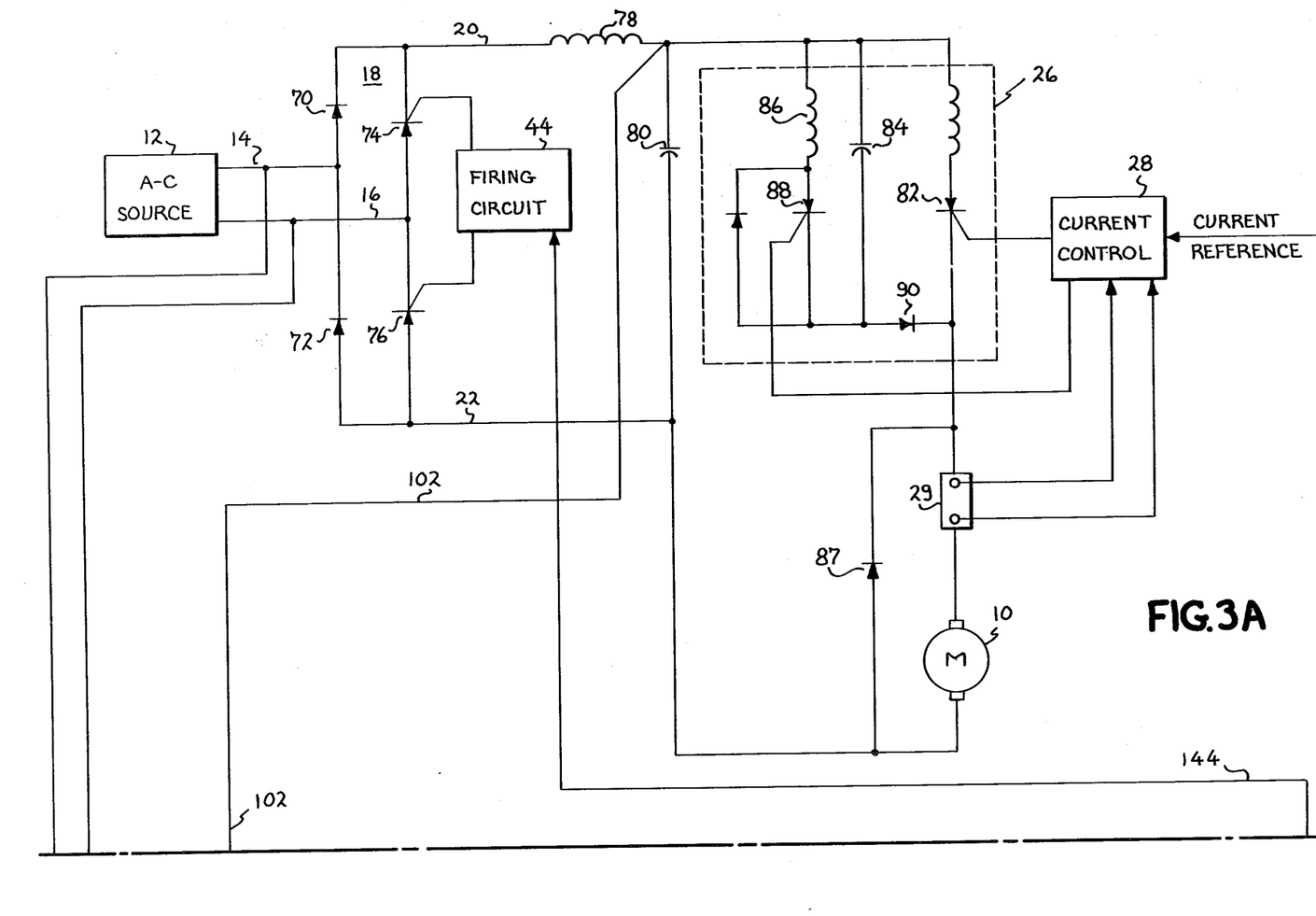
FIG. 3A is a simplified schematic of the power circuit for a traction motor with which the present invention may be advantageously used.

FIG. 3 illustrates the interrelationship between FIGS. 3A and 3B. The detailed description to follow will be with reference to FIGS. 3A and 3B taken in conjunction as shown in FIG. 3. Referring to FIGS. 3A and 3B, the inventive system is illustrated in a d-c motor control system wherein Referring now to FIG. 3, there is shown a simplified schematic/block diagram of the inventive system of FIG. 1 as applied to a d-c motor system wherein the regulator circuit 26 is a chopper circuit. The a-c source 12 supplies an a-c voltage via the lines 14 and 16 to the phase control rectifier circuit 18 which is shown as comprising a full wave bridge rectifier circuit including the semiconductor diodes 70 and 72 and the valves 74 and 76 which may comprise semiconductor controlled rectifiers (SCR) or other suitable controllable switching devices. The thyristor firing circuit 44 supplies gating signals to the valves 74 and 76 in order to control the magnitude of the unidirectional current produced at the output terminals of the rectifier circuit 18. Both the bridge rectifier arrangement and the firing circuit 44 are well known in the art and are described in detail in Chapter 9 of the *GE SCR Manual*, Fifth Edition, published in 1972 by the Semiconductor Products Department, General Electric Company, Syracuse, N.Y.

The d-c filter 24 is illustrated as comprising a series inductor 78 and a shunt capacitor 80. The filter output voltage $V_{d-c}$ is developed across the capacitor 80 and is applied to the series combination of the power regulator circuit 26 and motor 10. In the illustrative embodiment the motor 10 is assumed to be a series wound motor including series connected armature and field windings. However, the motor 10 could represent an armature of a shunt wound motor wherein the field winding is separately excited. The regulator circuit 26 is illustrated as comprising a chopper circuit having a main thyristor 82 which controls current to the motor 10. The commutating circuit for the thyristor 82 includes a capacitor 84, an inductor 86, and an auxiliary thyristor 88. A diode 90 connects the commutating circuit to the cathode of the thyristor 82. A detailed description of such a chopper circuit as that illustrated may be had by reference to U.S. Pat. No. 4,017,777—Bailey, issued Apr. 12, 1977 and assigned to the General Electric Company. The current control circuit 28 responsive to a current reference signal for supplying gating signals to the chopper thyristors 82 and 88 is described and discussed in more detail in the aforementioned U.S. Pat. No. 3,866,098. In a traction vehicle the current reference signal is typically supplied by an operator from an "accelerator" or other power or velocity control means well known in the art. A signal representative of motor current is supplied to control circuit 28 from a current shunt 29 in the motor current path. A free-wheeling diode 87 provides a motor current path when the chopper 26 is non-conducting.

The coupling circuit 48 includes a transformer 92 having a primary winding connected to the a-c output terminals of source 12 and a secondary winding connected to a full wave rectifier 93 including the diodes 94 and 96. The output of the full wave rectifier 93 provides a lower voltage rectified a-c signal which is applied through a buffering resistor 98 to a non-inverting input terminal of a comparator 100. The $V_{d-c}$ signal representing the voltage at capacitor 80 is coupled via a line 102 from the upper terminal of the capacitor 80 to a voltage divider circuit comprising resistors 104 and 106. A terminal 107 intermediate the resistors 104 and 106 is connected to an inverting input terminal of comparator 100. A resistor 109 connected between terminal 107 and a voltage source $+V$ provides a small offset voltage to comparator 100.

The comparator 100 is arranged to compare the signal representative of $V_{d-c}$ to the instantaneous magnitude of the a-c signal from rectifier 93. The comparator 100 is connected such that it switches from a normal low voltage (logic 0) output signal condition to a higher voltage (logic 1) output signal condition when the magnitude of the rectified a-c signal becomes greater than the magnitude of the signal at terminal 107. In order to assure rapid switching, a positive feedback path is provided via a resistor 112 from the output terminal of comparator 100 to its non-inverting input terminal. Comparator 100 and its associated components described above are substantially equivalent to the comparator 50 of FIG. 1.

Signals developed by the comparator 100 are coupled through a resistor 118 and an inverter 119 to a clock (CL) input terminal of a one shot multivibrator 120 and to a first input terminal of a logical NOR gate 122. A 'Q' or non-inverted output terminal of multivibrator 120 is connected to a second input terminal of NOR gate 122. An output terminal of NOR gate 122 is connected to a clock (CL) input terminal of a second one-shot or monostable multivibrator 140. An inverted or 'Q̄' output terminal of multivibrator 140 is connected to a first input terminal of NAND gate 40. The combination of the two multivibrators 120 and 140 with the NOR gate 122 provides a double pulsing effect, i.e., two firing pulses spaced in time an amount equal to the time duration of the pulse developed by multivibrator 120 are supplied to the NAND gate 40. The double pulsing results because the initial signal produced at the output terminal of inverter 119 is coupled directly through NOR gate 122 to the clock terminal of multivibrator 140 causing the latter to change its output state. However, the signal from inverter 119 is also applied to multivibrator 120 causing it to change its output state. When this last event occurs, the signal at the output terminal of NOR gate 122 is forced back to a logic 0 level. Since the time required for multivibrator 120 to change state in response to a signal on its clock terminal is relatively short, the first signal produced by NOR gate 122 will be of relatively short duration, i.e., substantially a pulse output signal. Thereafter, multivibrator 120 will hold NOR gate 122 in its logic 0 state for a predetermined time period, i.e., multivibrator 120 will provide a relatively high voltage or logic 1 output signal for the predetermined time period. At the end of the predetermined time period, the signal at the Q output terminal of multivibrator 120 will revert to a low voltage or logic zero state causing the signal at the output terminal of NOR gate 122 to transition from a logic zero to a logic one state.

The multivibrator 140 is connected to be triggered by a positive transitioning clock signal. Since two such clock signals are produced by NOR gate 122 each time comparator 100 generates a logical one signal state, multivibrator 140 is triggered twice and produces two consecutive valve firing signals. It is noted that multivibrator 120 is triggered by a negative transitioning clock signal whereas multivibrator 140 is triggered by a positive transitioning clock signal. Multivibrators capable of being triggered by either type of signal are well known in the art, a typical type being a device manufactured by Motorola Corp. under the part number 14528. It will be appreciated that the multivibrators 120 and 140 and the NOR gate 122 comprise the pulse shaper 52 of FIG. 1.

A second input terminal of NAND gate 40 is connected to receive the normal valve firing signal developed by the comparison of the voltage error signal from control circuit 38 with the synchronized ramp generator signal. The voltage control circuit 38 includes an integral plus proportional amplifier comprising amplifier 128, resistor 132 and capacitor 134. To generate the voltage error signal, the reference voltage signal $V_{REF}$ is first compared with the d-c voltage signal representative of $V_{d-c}$. This comparison is achieved by coupling the $V_{REF}$ signal through a resistor 130 to a summing junction 124 at an inverting input terminal of amplifier 128. A resistor 126 connects terminal 107 to summing junction 124 thus coupling the signal representative of $V_{d-c}$ to junction 124.

The amplifier 128 is connected to function as an integral plus proportional amplifier using the feedback resistor 132 and the integrating capacitor 134, the resistor 132 and capacitor 134 being connected in parallel between the inverting input terminal and the output terminal of amplifier 128. The non-inverting input terminal of amplifier 128 is connected to a ground potential. With the illustrated and described connections, amplifier 128 operates to provide an analog error output signal representative of the phase conduction angle required of the valves 74 and 76 in order to minimize the difference between the desired magnitude of $V_{d-c}$ as represented by $V_{REF}$ and the actual magnitude of $V_{d-c}$.

The output terminal of amplifier 128 is connected to a non-inverting input terminal of a comparator 136 which is substantially equivalent to comparator 36 of FIG. 1. An inverting input terminal of comparator 136 is connected to an output terminal of ramp generator circuit 32 for receiving the ramp function signal. As will be appreciated from the above-described connections the comparator 136 will provide a relatively high voltage (logic 1) output signal so long as the voltage magnitude of the signal on its inverting input terminal is greater than the voltage magnitude of the signal on its non-inverting input terminal. However, when the larger of the two voltages appears at the non-inverting input terminal, comparator 136 will provide a relatively low voltage (logic 0) output signal. In the illustrative embodiment the ramp function signal is a negative going signal. Assuming a normal error signal from amplifier 128, the ramp function signal will initially be of greater magnitude than the error signal and comparator 136 will provide a relatively high voltage (logic 1) output signal. As the ramp decreases in amplitude a point will be reached at which the error signal is of greater magnitude than the ramp signal and amplifier 136 will produce a relatively low voltage (logic 0) output signal.

The output terminal of comparator 136 is connected through a resistor 138 to the second input terminal of NAND logic gate 40. An output terminal of NAND gate 40 is connected to a clock (CL) input terminal of a one-shot multivibrator 142. A change in state of the comparator 136 causes the NAND gate 40 to change state thus providing an output signal to the one shot multivibrator 142. The multivibrator 142 is equivalent to the pulse shaper 42 of FIG. 1. When the multivibrator 142 changes state a signal is sent via line 144 to the firing circuit 44 which then provides appropriate triggering or firing signals to the valves 74 and 76.

As discussed supra, the NAND gate 40 discriminates between firing signals generated by the re-firing circuit, i.e., the circuit which compares the a-c voltage to $V_{d-c}$, and firing signals generated in response to the analog error voltage. Such discrimination is attained in the illustrative embodiment by having the signal from multivibrator 140 be a logical 1 signal which transitions to a logical 0 when it is desired to produce a firing signal while having the signal from comparator 136 be a logical 0 signal which transitions to a logical 1 when it is desired to produce a firing signal. Thus, without a change in state of the signal from comparator 136, the signal from multivibrator 140 will have no effect on the state of the signal from NAND gate 40.

As will be appreciated the foregoing description has illustrated a control system for a full wave thyristor rectifier circuit which is supplied from a source of a-c voltage and which allows firing of the thyristors at appropriate times in the cycle of operation without regard to any difference in voltage between the output terminals and the input terminals of the rectifier circuit. The system eliminates the necessity for providing a continuous firing signal and minimizes the power requirements normally attendant upon such a circuit.

While we have shown and described what is presently considered to be the best mode of our invention by way of illustration, other modifications will no doubt occur to those skilled in the art. We therefore intend herein to cover all such modifications as fall within the true spirit and scope of the invention.

What we claim as new and desire to secure by Letters Patent of the United States is:

1. A power control system for an electric motor powered from an alternating voltage source comprising:
   (a) a phase-controlled rectifier circuit having a-c input terminals adapted to be connected to the alternating voltage source, a pair of d-c output terminals, and means including a plurality of controllable electric valves for interconnecting the input and output terminals, said valves being cyclically fired at firing angles that can be varied to control the average magnitude of d-c voltage across said output terminals;
   (b) a filter circuit including a shunt capacitor connected to said d-c terminals;
   (c) power regulating means for connecting said filter circuit to the motor and operative to control the motor power as desired; and
   (d) control means for periodically supplying firing signals to said rectifier circuit so as to fire said valves at variable firing angles, said control means including:
      (i) first means for generating a train of first firing signals in synchronism with the alternating voltage at said input terminals, said first means including means responsive to the d-c voltage across said capacitor for varying the firing angles of said first firing signals as necessary to maintain substantially a desired magnitude of capacitor voltage;

(ii) second means responsive both to said capacitor voltage and to the alternating voltage at said input terminals for generating second firing signals every time the instantaneous magnitude of the latter voltage becomes greater than the actual magnitude of capacitor voltage; and (iii) means for coupling to said rectifier circuit said first firing signals and additionally any second firing signal that is generated after a first firing signal during each half cycle of alternating voltage.

2. The system of claim 1 wherein said filter circuit includes an inductor interposed between one of said d-c output terminals and said shunt capacitor.

3. The system of claim 2 wherein said control means comprises:

(a) means for comparing said capacitor voltage to a reference voltage and for producing a first signal representative of the firing angle required to minimize the difference therebetween;

(b) means for generating a repetitive ramp function signal in synchronism with the a-c voltage from said alternating voltage source;

(c) means for comparing said first signal to said ramp function signal and for generating said first firing signals each time the magnitude of said ramp function signal crosses the magnitude of said first signal;

(d) means for comparing the magnitude of said capacitor voltage to the instantaneous magnitude of said a-c voltage and for generating said second firing signals each time said a-c voltage becomes greater than said capacitor voltage; and (e) interconnecting means for coupling said first and second firing signals to said rectifier circuit, said interconnecting means including means for inhibiting transmission of said second firing signal when said second firing signal preceeds said first firing signal during any half cycle of said a-c voltage.

4. The system of claim 2 wherein said power regulating means comprises a time ratio control thyristor circuit and said motor is a d-c motor.

5. The system of claim 2 wherein said power regulating means comprises an inverter circuit and said motor is an a-c motor.

6. A power control system for an electric traction motor powered from a source of alternating voltage, said system comprising:

(a) a phase controlled rectifier circuit having a-c input terminals adapted to be connected to said alternating voltage source, a pair of d-c output terminals, and means including a plurality of controllable electric valves for interconnecting the input and output terminals, said valves being cyclically fired at firing angles that can be varied to control the average magnitude of d-c voltage developed at the output terminals;

(b) a filter circuit including a shunt capacitor connected to said output terminals;

(c) power regulating means for connecting the d-c motor to said filter circuit and operative to control the average magnitude of motor current as desired;

(d) control means for periodically supplying firing signals to said rectifier circuit so as to fire said valves at variable firing angles, said control means including:

(i) means for comparing the instantaneous magnitude of the alternating voltage to the d-c voltage at said shunt capacitor, said comprising means providing a first signal when said d-c voltage magnitude is less than said alternating voltage magnitude and a second signal when said d-c voltage magnitude is greater than said alternating voltage magnitude;

(ii) pulse shaper means connected for receiving the signals from said comparing means, said pulse shaper means generating a pulse signal of predetermined time duration in response to the occurrence of said first signal;

(iii) voltage controller means connected for monitoring said d-c voltage at said shunt capacitor, said voltage controller means providing a voltage error signal representative of the deviation of said d-c voltage magnitude from a predetermined desired voltage magnitude;

(iv) function generator means connected for generating a repetitive ramp function signal in synchronism with said alternating voltage;

(v) comparison means connected for comparing the instantaneous magnitude of said ramp function signal to the magnitude of said voltage error signal, said comparison means producing a third signal when the magnitude of said voltage error signal is greater than the instantaneous magnitude of said ramp function signal and a fourth signal when the magnitude of said error signal is less than the instantaneous magnitude of said ramp function signal;

(vi) a logical gating means having a first input terminal connected for receiving said pulse signal and a second input terminal connected for receiving said signals from said comparison means, said logic gating changing the state of its output signal from a logical one state to a logical zero state at each transition of said fourth signal to said third signal and further changing the state of its output signal from a logical zero state to a logical one state for any time period during which said pulse signal is present in conjunction with said third signal;

(vii) second pulse shaping means connected for receiving the output signal developed by said logical gating means, said second pulse shaping means providing a firing signal of predetermined time duration each time said output signal from said logical gating means transitions from a logical one state to a logical zero state; and (viii) valve firing means for interconnecting said firing signals from said second pulse shaping means to said valves in said phase controlled rectifier circuit.

* * * * *

UNITED STATES PATENT AND TRADEMARK OFFICE
CERTIFICATE OF CORRECTION

PATENT NO. : 4,152,758
DATED : May 1, 1979
INVENTOR(S) : R. B. Bailey, T. D. Stitt, D. F. Williamson It is certified that error appears in the above-identified patent and that said Letters Patent are hereby corrected as shown below:

Column 12, line 10, "comprising" should be deleted and substitute -- comparing --

*Signed and Sealed this*

*Tenth Day of July 1979*

[SEAL]

*Attest:*

*Attesting Officer*

LUTRELLE F. PARKER
*Acting Commissioner of Patents and Trademarks*